United States Patent [19]

Conway

[11] Patent Number: 4,884,896

[45] Date of Patent: Dec. 5, 1989

[54] PRODUCTION LINE EMISSIVITY MEASUREMENT SYSTEM

[75] Inventor: Thomas G. Conway, Woodbridge, Va.

[73] Assignee: The United States of America as represented by the Secretary of the Army, Washington, D.C.

[21] Appl. No.: 296,569

[22] Filed: Jan. 13, 1989

[51] Int. Cl.[4] .......................... G01J 5/10; G01N 25/00
[52] U.S. Cl. ................................... 374/9; 219/201; 250/342; 364/557; 374/121
[58] Field of Search ................................ 374/9, 32, 129; 250/342; 356/43; 89/36.4; 73/159; 219/201

[56] References Cited

U.S. PATENT DOCUMENTS

| | | | |
|---|---|---|---|
| 2,848,626 | 8/1958 | Brackmann | 374/9 X |
| 3,277,715 | 10/1966 | Vanderschmidt | 379/9 |
| 3,401,263 | 9/1968 | Birkebak | 374/9 X |
| 3,626,758 | 12/1971 | Stewart et al. | 374/129 |
| 4,435,093 | 3/1984 | Krause et al. | 250/342 X |
| 4,459,043 | 7/1984 | Luke | 356/43 X |
| 4,465,382 | 8/1984 | Iuchi et al. | 374/126 X |
| 4,529,633 | 7/1985 | Karlsson | 428/49 X |
| 4,615,921 | 10/1986 | Johansson | 428/17 |
| 4,626,686 | 12/1986 | Pompei et al. | 374/124 X |
| 4,645,358 | 2/1987 | Blume | 374/122 X |
| 4,747,699 | 5/1988 | Kobayaski et al. | 374/19 X |
| 4,801,212 | 1/1989 | Imura | 356/43 X |

Primary Examiner—Daniel M. Yasich
Attorney, Agent, or Firm—Milton W. Lee; Anthony T. Lane

[57] ABSTRACT

The emissivity of camouflage material is determined from the apparent body temperature measured by a radiometer, calibrated to indicate a temperature of a blackbody would emit corresponding to the radiation received therefrom; and the true temperature of the material and the true temperature at an infrared detector of the radiometer of a radiometer. Computation means is provided for calculating emissivity from the so measured temperatures and for displaying the result.

12 Claims, 1 Drawing Sheet

4,884,896

PRODUCTION LINE EMISSIVITY MEASUREMENT SYSTEM

GOVERNMENT INTEREST

The invention described herein may be manufactured and used by or for the United States Government for Governmental purposes without the payment of any royalties and is being assigned to the United States Government.

BACKGROUND OF THE INVENTION

This invention relates to the measurement of the electromagnetic radiation emissivity of surfaces in the infrared wavelength spectrum. It relates specifically to apparatus and a method for determining the emissivity of camouflage material such as woven or nonwoven fabrics or plastic sheets or nets, slightly above ambient temperature. The apparatus and method of this invention are particularly useful as a practical production line system wherein a particular value or range of values of emissivity is likely to be specified for camouflage material. It provides a means of monitoring the emissivity of camouflage material for quality control during its manufacuture on a production line.

Blackbodies radiate electromagnetic energy in accordance with the Stefan-Boltzmann radiation law, the rate of energy emission being proportional to the fourth power of the absolute temperature of the radiating blackbody. Nonblack bodies radiate electromagnetic energy at a lower rate than do blackbodies at the same temperature, the ratio of nonblack to blackbody radiation at any given temperature being the nonblack body's emissivity.

Radiometers measure the radiant energy emitted by a radiating source. They are calibrated to indicate the temperature of a blackbody which would emit the observed thermal radiation received by a radiometer detector. This temperature will herein be referred to as the apparent temperature. The difference between the true physical temperature of an emitting surface and its apparent temperature as measured by a radiometer affords a means of determining the emissivity of the emitting surface.

Methods and apparatus for the determination of the electromagnetic emissivity of materials are known. U.S. Pat. No. 4,645,358 describes a method and apparatus for determining the electromagnetic emissivity of antennas in the wavelength range of interest in radiocommunications and apparatus involving a radiometer. It involves the determination of the apparent temperature of a test object at two different physical temperature levels and an algorithm for calculating emissivity from the two apparent temperatures and the two actual temperatures. It requires the use of a cryogenically cooled surface serving as a stabilizing source of uncorrelated radiation in the system by radiating at a constant temperature far below that of the system, thereby keeping uncorrelated-radiation at a minimum.

U.S. Pat. Nos. 4,172,383 and 4,465,382 describe systems in which a test surface is irradiated with blackbody radiation from a furnace at two different energy levels, and the energies reflected by the surface are measured with a radiometer. An algorithm and the components for a computation system for continuously computing the emissivity of the test surface are provided.

U.S. Pat. No. 4,408,878 describes system comprising two radiometers, one in a substantially totally reflecting enclosure and the other in a substantially totally absorbing enclosure, which are moved to the immediate proximity of the surface whose emissivity is to be determined, and then removed, thereby providing signals from which the emissivity of the surface can be calculated.

Although the apparatus and methods taught by these patents allow the determination of emissivity of objects and employ, in some instances, apparatus components similar to those used in the present invention, e.g. radiometers, none of the apparatus and methods described lend themselves to continuous, on-line monitoring of emissivity near ambient temperature as envisioned by the present invention.

OBJECT OF THIS INVENTION

It is the object of this invention to provide a simple and practical method and apparatus for determining the emissivity of materials, specifically materials for camouflaging objects from detection with infrared sensing devices, continuously on a production line for purposes of quality control of such camouflaging material.

SUMMARY OF THE INVENTION

This invention relates to apparatus and a method for determining the emissivity of camouflage material such as woven or nonwoven fabrics or plastic sheets or nets, slightly above ambient temperature. The apparatus and method of this invention are particularly useful as a practical production line system wherein a particular value or range of values of emissivity is likely to be specified for camouflage material It provides a means of monitoring the emissivity of camouflage material for quality control during its manufacture on a production line.

The apparatus of this invention comprises five basic known components arranged and utilized in a novel manner:

1. A digital radiometer which is sensitive electromagnetic radiation in the wavelength range from 8 to 14 microns, embodying a commercially available infrared detector;

2. A highly reflective, very low emissivity tube having a diameter equal to that of the radiometers' aperture, to which the tube is connected, which insures that all the infrared radiation given off by the area of the camouflage material being tested is received by the radiometer and which furthermore excludes all extraneous radiation from the surroundings;

3. Thermocouples or other means for monitoring the temperature of the camouflage material whose emissivity is being monitored and the temperature at the aperture of the radiometer;

4. A heating element for raising the temperature of the camouflage material slightly above ambient temperature; and 5. Computer means programmed to calculate the emissivity from collected temperature data by an appropriate algorithm.

Complete capture by the radiometer of all electromagnetic radiation emitted by the camouflage material being tested is assured by choosing the tube inside diameter to be equal to that of the aperture of the radiometer where the tube joins the radiometer, and its length to be equal to the focal length of the radiometer optics. The end of the tube that is adjacent to the camouflage material will have an inside diameter equal to the diameter of the detector's field of view at the focal length of the radiometer optics.

DISCUSSION OF OPERATING PRINCIPLES

Blackbodies radiate electromagnetic energy in accordance with the Stefan-Boltzmann radiation law, the rate of energy emission being proportional to the fourth power of the absolute temperature of the radiating blackbody. Nonblack bodies radiate electromagnetic energy at a lower rate than do blackbodies at the same temperature, the ratio of nonblack to blackbody radiation at any given temperature being the nonblack body's emissivity.

Radiometers measure the radiant energy emitted by a radiating source. They are calibrated to indicate the temperature of a blackbody which would emit the observed thermal radiation received by an infrared detector of the radiometer. This temperature will herein be referred to as the apparent temperature. The difference between the true physical temperature of an emitting surface and its apparent temperature as measured by a radiometer affords a means of determining the emissivity of the emitting surface.

From the Stefan-Boltzmann radiation law and an analysis of the net radiant heat flux flowing from a radiating source to a radiometer, it will be shown that $$\text{emissivity} = \frac{(Tapp.)^4 - (Tdet.)^4}{(Tact.)^4 - (Tdet.)^4}$$

where

Tapp. is the apparent temperature of a test surface as sensed and indicated by a radiometer, Tdet. is the temperature of the radiometer detector and its housing, and Tact. is the actual temperature of the camouflage material at the point where its emissivity is being determined.

The temperatures in the above equation are absolute temperatures, expressed in degrees Kelvin. In the above formula, "Tdet." takes into account the infrared energy emitted by the detector and reflected by the camouflage material. It allows the emissivity to be calculated from one set of apparent and actual temperature values, whereas the techniques known in the prior art require measurement of at least two sets of temperatures.

The apparatus of this invention in combination determines the three temperatures used in the above equation. Signals for the above three temperature are used directly for continuously calculating and displaying the emissivity of the test surface. The emissivity of the material may thus be monitored on a production line, and deviations from specifications may be signalled visually or acoustically.

When the tube and radiometer are in contact so that no radiation will leave the system and no radiation from outside may enter the system, the radiation heat transfer may be modelled as two infinite parallel planes, one plane being the camouflage material and the other plane the radiometer detector. Radiation from the material surface propagates either directly to the detector or by reflection off the walls of the tube. The radiant heat transfer to the radiometer detector is complicated by the fact that the radiometer detector itself radiates energy which is reflected by the camouflage material back to the radiometer detector.

The derivation of the above formula will now be presented. As noted above, blackbodies radiate electromagnetic energy in accordance with the Stefan-Boltzmann radiation law, the rate of energy emission being proportional to the fourth power of the absolute temperature of the radiating blackbody. Nonblack bodies radiate electromagnetic energy at a lower rate than do blackbodies at the same temperature, the ratio of nonblack to blackbody radiation at any given temperature being the nonblack body's emissivity.

The total power emitted by a perfect blackbody surface is given by the equation $$E_b = \sigma T^4$$

where $E_b$ = blackbody power radiated from the surface,
$\sigma$ = Stefan-Boltzmann constant
T = actual surface temperature, degrees Kelvin.

Radiant power emitted by real surfaces is lower than that of a blackbody surface at the same temperature. It is represented by the equation $$E_e = \epsilon \sigma T_s^4$$

where $E_e$ = power emitted from a real surface
$\epsilon$ = emissivity
$T_s$ = actual surface temperature, degrees Kelvin.

Energy reflected by a real surface is the energy emitted by the objects surrounding the surface, attenuated by the surface's reflectivity, and is represented by the equation $$E_R = p\sigma(Tdet.)^4$$

where $E_R$ = reflected power from a real surface
p = reflectivity of the surface
$\sigma(Tdet.)^4$ = emitted power radiated from detector of radiometer approximated as a blackbody due to its high absorptivity.

Reflectivity of an opaque surface may be expressed in terms of the surface emissivity. Incident radiation on a surface may be reflected, absorbed or transmitted. Opaque objects have a transmittance of zero. The following equation accounts for what happens to all of the energy incident upon a given surface % incident radiation = % A + % R + % T where % A is the percentage of incident energy absorbed by the surface of the camouflage material,
% R is the percentage of energy reflected by the surface of the camouflage material, and
% T is the percentage of incident energy transmitted by the surface of the camouflage material.

Under thermal equilibrium, the surface absorptivity is equal to the surface emissivity With this in mind and all associate energy normalized to unity, the equation for the energy balance is stated in terms of emissivity, wherein unity is represented by the number 1.

$$1 = \epsilon + p + t$$

$\epsilon$ = reflectivity
p = reflectivity
t = transmittance = 0 for opaque surfaces.

The result is that the reflectivity is equal to unity minus the emissivity, $$p = 1 - \epsilon$$

Combining all terms for the energy balance at the camouflage surface $$\sigma(Tapp.)^4 = \epsilon\sigma(Tact.)^4 + (1-\epsilon)\,\sigma(Tdet.)^4$$

Canceling the Stephan-Boltzmann constant and multiplying out the third term simplifies the equation:

$$(Tapp.)^4 = \epsilon(Tact.)^4 + (Tdet.)^4 - \epsilon(Tdet.)^4$$

Solving for emissivity $\epsilon$, $$\text{Solving for emissivity } \epsilon, \text{ emissivity} = \frac{(Tapp.)^4 - (Tdet.)^4}{(Tact.)^4 - (Tdet.)^4}$$

where

Tapp. is the apparent temperature of a test surface as sensed and indicated by a radiometer, Tdet. is the temperature of the radiometer detector and its housing, and Tact. is the actual temperature of the camouflage material at the point where its emissivity is being determined.

DETAILED DESCRIPTION OF PREFERRED EMBODIMENT OF THE INVENTION

Figure 1:
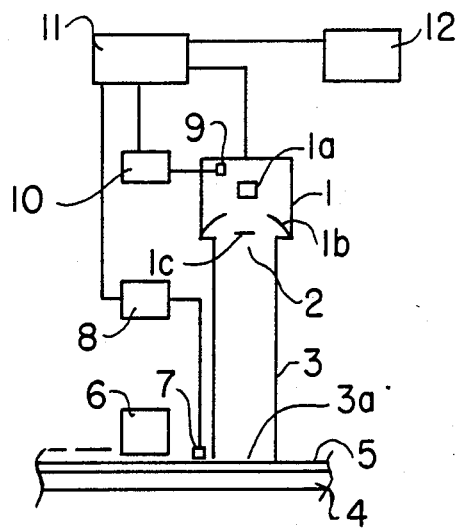
FIG. 1 is a schematic view of the apparatus of this invention.
Figure 3:
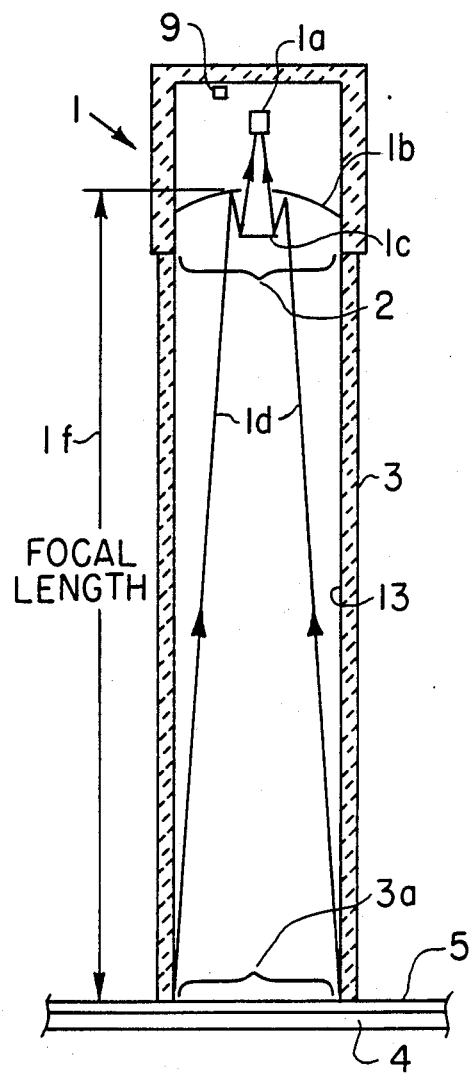
FIG. 3 is a more detailed cross-section of the radiometer and the tube showing the detector and a parabolic and a flat reflector in the radiometer.

With reference to FIGS. 1 and 3, a radiometer 1 has an infrared detector 1a and a radiometer aperture 2 facing downward into a vertical cylindrical hollow tube 3 having a highly reflective inside surface. A parabolic reflector 1b and a flat reflector 1c focus all radiation incident on the detector aperture 2 onto the infrared radiometer 1a.

Digital radiometers in the infrared range are commercially available; therefore, no detailed description of their construction is provided here. Examples of commercially available radiometers having a gallium arsenide detector are "Thermopoint", manufactured by AGA, Inc. and "Heat Spy". manufactured by Wahl Inc. These radiometers are sensitive to infrared energy in a range of from approximately 8 microns to 14 microns. Sensitivity of this detector is very flat spectrally. Therefore, it provides very good averaging of the infrared energy and requires no correction for spectral non-linearity. Thus, from a practical standpoint, this sensor is ideal for production line emissivity measurement because it requires no cooling.

Tube 3 has an inside diameter equal to the diameter of the radiometer aperture 2, and it is attached to the radiometer 1 such that the radiometer aperture 2 is enclosed by tube 3. The tube diameter also equals the diameter of the circular spot of camouflage material immediately below the lower aperture 3a of the tube which focuses on the radiometer's infrared detector 1a via the parabolic reflector 1b and the planar reflector 1c. The length of tube 3 is such that the image of the circular spot of camouflage material immediate below the lower aperture 3a of the tube is in focus, i.e. all the radiation 1d from the spot of camouflage material originates in a circular area equal to the circular field of view of the radiometer at the focal length 1f of the radiometer optics. The length of the tube thus is equal to the focal length of radiometer optics.

The tube is made of PYREX glass and coated with metal or metal oxide film, such as nickel oxide to provide high reflectivity, with very low emissivity, on its inside surface. PYREX is furthermore prefered because it minimizes thermal conduction and does not corrode.

The interior surface of tube 3 with its high reflectivity (low emissivity) serves many purposes that are important to the function of this system. It blocks out all stray infrared radiation from entering the system so that only thermal energy from the camouflage material may be present. It also traps all the thermal radiation emitted by the camouflage material so that none of this energy may escape detection by the detector. In short, the tube ensures that all of the thermal energy from the material reaches the detector while at the same time ensuring that all the thermal energy reaching the detector is from only the camouflage material and from no other source.

Owing to the low emissivity of the inside surface of the tube 3, it will contribute a negligible amount of infrared energy. Cooling of the sides of the tube is considered unnecessary. Any thermal radiation from the camouflage material incident upon the inner tube surface will be reflected to the detector. As has been pointed out, the energy detected by the detector is not only thermal energy emitted by the material but also energy emitted by the detector and detector housing that is reflected by the camouflage material back to the detector.

Spaced slightly below the lower opening 3a of tube 3 is a support surface 4 on which the camouflage material 5 whose emissivity is to be determined is placed. The material 5 is moved horizontally on the support surface 4 in such manner that all portions of the material pass continuously along its length under the lower opening 3a of tube 3 for inspection. The clearance between the surface of the test material 5 and the lower edge of tube 3 is kept to a minimum so as to exclude stray radiation from the surroundings from entering the tube and thereby introducing an error in the radiometer reading.

The material 5 is heated by a heater 6 to a slightly elevated temperature before it advances under the lower opening 3a of tube 3. The specific type of heater is not important. Radiant heaters or resistance heaters or the like are acceptable. Also, if the material manufacturing process requires heating, a separate heater element may not be required. The true temperature of the test material is determined by temperature measuring means 7, e.g. a thermocouple located immediately adjacent to the the lower aperture 3a of tube 3, and indicated by temperature indicating means 8, e.g. a potentiometer, voltmeter. The temperature of the radiometer detector and housing is similarly determined by temperature measuring means 9, e.g. a thermocouple located at the radiometer detector aperture 2, and indicated by temperature indicating means 10.

Figure 2:
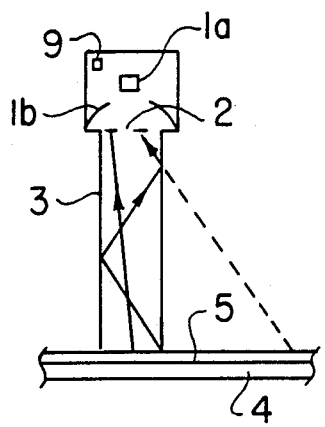
FIG. 2 is a simplified cross-section of the apparatus illustrating the manner in which thermal radiation energy flows from the material to the radiometer by direct line-of-sight transmission and by reflection off the walls of a high-reflectivity tube.

In FIG. 2, it can be seen that the thermal radiation given off by camouflage material 5 within the circular spot immediately below the lower aperture 3a of tube 3 is transmitted either by direct line-of-sight transmission or by reflection off the inside wall of tube 3 to the detector aperture 2 of the radiometer 1. The radiometer thus receives the entire radiant energy output of the circular spot of the material 5 as well as the radiant energy emitted by the radiometer and reflected off the camouflage material 5 back to the radiometer, and generates a signal corresponding to the material's apparent temperature, being defined as the temperature of the camouflage material as measured by the radiometer. It includes the total power emitted from and reflected by the camouflage surface. The dashed line in FIG. 2 indicates that if actual ray traces were extended as images, the detector and camouflage material could be modelled as two infinite planar surfaces.

The apparent temperature of the material 5, in conjunction with the true temperatures of the material 5 and the infrared detector, are used by computing means 11 which is programmed to calculate the emissivity of the material 5 in accordance with the formula derived above. Optical or acoustic warning signals are generated by signaling means 12 when the material being tested fails to meet specifications with respect to emissivity.

This invention has been described in terms of a specific embodiment thereof. It is not so limited, and numerous variations and modifications thereof will be apparent to those skilled in the art. It is to be understood that within the scope of the appended claims, the invention may be practiced otherwise than as specifically described.

We claim:

1. An apparatus for determining the electromagnetic radiation emissivity in the infrared wavelength range of camouflage material comprising
   a radiometer capable of generating a first signal in response to radiant energy output from said camouflage material, having an infrared detector and radiometer aperture for receiving the radiant energy output from said material, said signal being a measure of an apparent temperature of the material,
   a tube having an inside diameter equal to that of the radiometer aperture, said tube being connected at its upper end to the radiometer in such manner that the detector aperture is enclosed in the tube and faces downwardly into the tube, said tube furthermore having an inside surface of high reflectivity, a lower opening of said tube being placed immediately above the camouflage material,
   means for measuring the actual temperature of the material, and said material being above ambient temperature immediately adjacent to said lower opening, and providing a second signal corresponding to said temperature,
   means for measuring the temperature of the infrared detector, providing a third signal corresponding to said temperature, said means being located adjacent to the infrared detector, and
   means for converting said first, second and third signals into temperature indications.

2. The apparatus in accordance with claim 1 wherein the radiometer has within it parabolic reflecting means having a focal length, for focusing radiant energy, and wherein the length of the tube is equal to the focal length of the radiometer.

3. The apparatus in accordance with claim 1 in which the temperature measuring means are thermocouples.

4. The apparatus in accordance with claim 1 further comprising heating means provided adjacent to said lower opening, for raising the temperature of the material above ambient temperature before it passes below said opening.

5. The apparatus in accordance with claim 4 in which the heating means is a radiant heater.

6. The apparatus in accordance with claim 4 in which the heating means is a resistance heater.

7. The apparatus in accordance with claim 1 in which the tube is made of PYREX glass and has a metal coating on its inside surface.

8. The apparatus in accordance with claim 1 in which said temperature signals are continuously recorded.

9. The apparatus in accordance with claim 1 further comprising means for processing said first, second and third signals in accordance with an algorithm whereby the emissivity of the material is calculated and displayed.

10. The apparatus in accordance with claim 1 further comprising signaling means for generating a fourth signal when the emissivity of the material fails to meet a predetermined specification.

11. A method for continuous, on-line determining the emissivity in the infrared wavelength range of a camouflaging material during its manufacture comprising the steps of connecting an apertured opening of a radiometer to a tube having an inside surface of high reflectivity, heating the material slightly above ambient temperature, measuring and indicating the temperature of the material, passing the material under the lower opening of said tube, said tube being sealingly connected at its upper end to a radiometer aperture and an infrared detector for measuring electromagnetic radiation of the material, measuring and indicating an apparent temperature of the material by means of the radiometer, measuring and indicating a true temperature at the detector, and calculating the emissivity of the material from said indicated temperatures.

12. The method in accordance with claim 11 in which the calculating is processed by a digital computer to calculate and display the calculated emissivity of the material.

* * * * *